United States Patent [19]

Struger et al.

[11] Patent Number: 4,553,224

[45] Date of Patent: Nov. 12, 1985

[54] MULTIPLEXED DATA HANDLER FOR PROGRAMMABLE CONTROLLER

[75] Inventors: Odo J. Struger, Chagrin Falls, Ohio; Barry E. Sammons, Whitefish Bay, Wis.

[73] Assignee: Allen-Bradley Company, Milwaukee, Wis.

[21] Appl. No.: 520,429

[22] Filed: Aug. 4, 1983

[51] Int. Cl.⁴ .............................................. G06F 1/00
[52] U.S. Cl. ................................................... 364/900
[58] Field of Search ... 364/200 MS File, 900 MS File, 364/140, 141, 146

[56] References Cited

U.S. PATENT DOCUMENTS 3,942,158  3/1976  Dummermuth ..................... 364/900
4,165,534  8/1979  Dummermuth et al. ............ 364/900
4,266,281  5/1981  Struger et al. ...................... 364/900
4,282,584  8/1981  Brown et al. ....................... 364/900

*Primary Examiner*—Raulfe B. Zache
*Attorney, Agent, or Firm*—Barry E. Sammons

[57] ABSTRACT

A programmable controller has input and output multiplexer modules through which I/O data may be transferred. A multiplexer array is stored in the controller memory for storing this I/O data and conventional programmable controller instructions in the user control program may be employed to examine or set specified bits in the stored array. The multiplexer module may take the form of two separate modules in which one module generates a select code to a matrix of switches or operating devices and the other module transfers data to or from a selected row in the matrix.

10 Claims, 12 Drawing Figures

MULTIPLEXED DATA HANDLER FOR PROGRAMMABLE CONTROLLER

BACKGROUND OF THE INVENTION

The field of the invention is programmable controllers, and particularly, microprocessor-based programmable controllers such as those disclosed in U.S. Pat. No. 4,165,534 entitled "Digital Control System with Boolean Processor," U.S. Pat. No. 4,282,584 entitled "Mini-Programmable Controller," and U.S. Pat. No. 4,266,281 entitled "Microprogrammed Programmable Controller."

Since their inception, programmable controllers have been clearly distinguishable from other programmable processors by their instruction set which is tailored to meet the specific needs of the control engineer. This instruction set provides a language which is easily understood and used by those who have heretofore designed systems of relays, switches and motors using ladder diagrams. Not only are programmable controller processors, such as those described above, designed to execute this special purpose instruction set, but program loaders such as those disclosed in U.S. Pat. Nos. 3,798,612; 3,813,649; and 4,070,702 have been developed to facilitate the loading and editing of control programs using this instruction set.

The programmable controller and its instruction set are particularly well suited to interface with industrial equipment. The input modules which receive signals from the industrial environment provide considerable noise immunity and high voltage isolation. The logic state of such inputs are examined once during each scan through the user's control program to provide up-to-date information on the state of high speed sensing devices connected to the input module. Where large numbers of sensing devices are employed, the cost of the input modules and supporting I/O rack is a large share of the total system cost. The same is true of output modules.

One effort to reduce the cost of the I/O interface circuiting is to provide an intelligent I/O module which can transfer "blocks" of I/O data through one I/O slot. Such an intelligent I/O module is disclosed in U.S. Pat. No. 4,293,924, entitled "Programmable Controller With High Density Intelligent I/O Interface," and it is particularly effective for providing high density analog-to-digital and digital-to-analog I/O ports. Another proposed solution is disclosed in U.S. Pat. No. 4,360,913, entitled "Multiplexing I/O Module." This module multiplexes a "bank" of I/O devices through a single programmable controller I/O slot with a minimum of circuitry. This module is particularly effective for inputting 4-bit BCD codes from thumbwheel switches commonly found on industrial equipment.

While a number of high density I/O modules are available, their use has been limited due to the complexity of the user control program required to operate them. Typically, the data for such an I/O module is placed in a designated file within the controller processor's memory, and the file handling facilities of the controller are employed to manipulate this data. Such file handling capabilities are disclosed in co-pending U.S. patent application Ser. No. 328,428, filed on Dec. 7, 1981 and entitled "Programmable Controller With Multiple Functions." These facilities are word oriented, and even then, the user is faced with a challenging programming job.

SUMMARY OF THE INVENTION

The present invention relates to a programmable controller which enables single-bit multiplexed I/O data to be easily manipulated. More specifically, the programmable controller includes memory for storing I/O data, means responsive to a control instruction in the user control program for establishing an array of n rows by m columns in the memory for storing a block of I/O data associated with a designated I/O port, means for coupling I/O data between the established array and its designated I/O port, and means responsive to an operation code in control instructions executed by the programmable controller for performing a logical operation on a single bit in the established array.

A general object of the invention is to facilitate the task of performing single bit logical operations on a block of I/O data. This is accomplished by treating the block as an array of data bits and identifying an element in that array with two pointer codes.

Another object of the invention is to enable blocks of I/O data to be input or output from the established array by any one of a number of techniques. For example, the control program can include instructions, such as block transfer instructions, which periodically are executed to couple data between the established memory array and the designated I/O port.

Yet another object of the invention is to provide an inexpensive and easily used means for multiplexing a block of I/O data through an I/O port. Rather than employing expensive high density or intelligent I/O modules to couple I/O data to or from the established array, conventional I/O modules may be used. In this embodiment, the automatic I/O scan which is periodically performed by the programmable controller is modified to transfer data between the established array and the designated I/O port. This transfer includes the generation of a multiplexer select code which identifies which row of the array is being transferred.

These and other objects and advantages of the invention will be apparent from the detailed description which follows. In the detailed description, reference is made to the accompanying drawings which form a part hereof and in which there is shown by way of illustration a preferred embodiment and a second embodiment of the invention. Such embodiments do not, however, define the full scope of the invention which is reserved for the claims that follow the description.

DESCRIPTION OF THE PREFERRED EMBODIMENT

Figure 1:
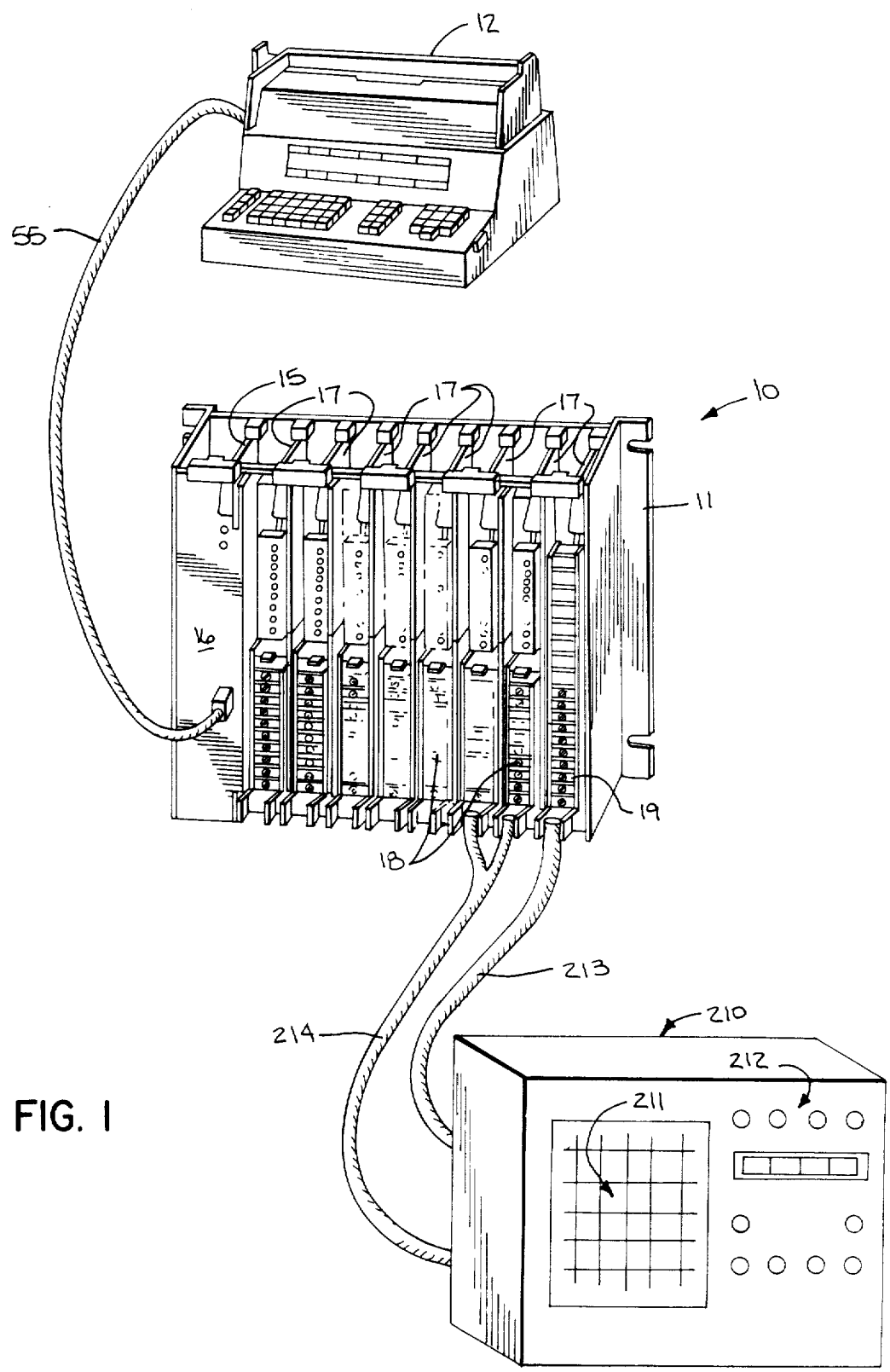
FIG. 1 is a perspective view of a programmable controller, program loader and an operator station.

Referring to FIG. 1, a programmable controller 10 is housed in a rack enclosure 11 and a detachable program panel 12 is connected through a communication cable 13 to a connector (hidden from view) on the front of the controller 10. The program panel 12 is employed by the user to enter and edit a control program into the programmable controller, and when this function is completed, it is unplugged from the controller 10 for storage or use with other programmable controllers.

The rack enclosure 11 holds a plurality of modules, which are printed circuit boards having various components, including integrated circuit "chips." The modules are held in an upright, closely spaced and substantially parallel position in the enclosure 11. On the far left is a processor board 15 which has a processor daughter board 1 (not shown) mounted piggyback on it to form a processor module 16. To the right of the processor module 16 are a plurality of I/O modules 17. The input-/output control capacity of the programmable controller can be increased or decreased by adjusting the size of the rack enclosure 11 to hold a different number and mix of I/O modules 17.

Connections between modules in the rack enclosure 11 are made through a hard-wired back plan (not shown in FIG. 1) on the back of the rack enclosure 11. Connections to sensing devices and operating devices on the machine being controlled are made through swing-arm connectors 19 on the front of the enclosure 11. Further information on the construction of the rack enclosure 11 is provided in U.S. Pat. No. 4,151,580 which issued on Apr. 24, 1979.

Figure 2:
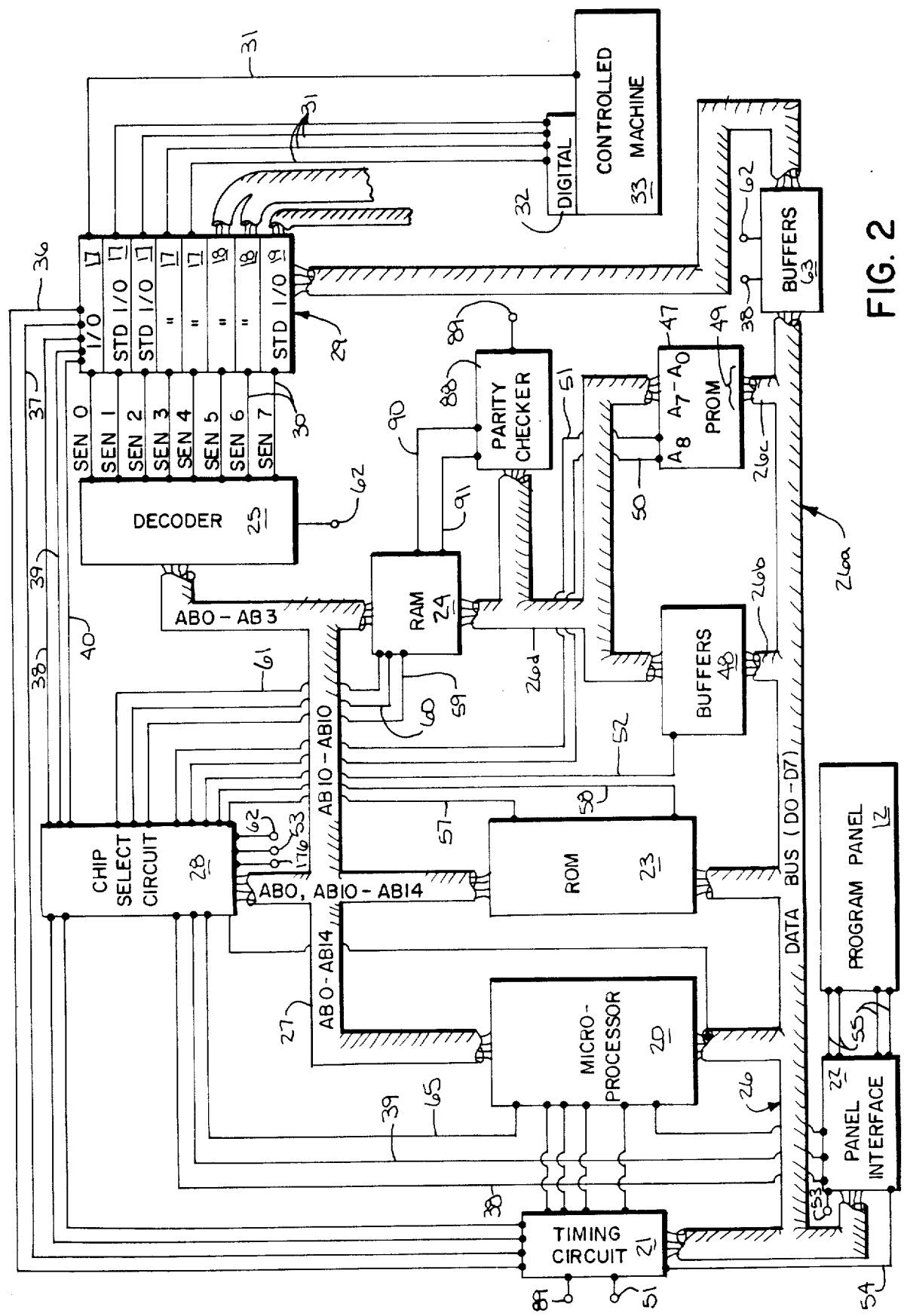
FIG. 2 is an electrical schematic diagram of the programmable controller of FIG. 1.

Referring to FIG. 2, the processor module 16 includes a main microprocessor 20, a timing circuit 21, a program panel interface circuit 22, a read-only memory (ROM) 23, a random access memory (RAM) 24 and a decoder circuit 25 that are interconnected through eight lines, D0–D7, of an eight-bit data bus 26. The microprocessor 20 is also connected through lines AB-0–AB14 of a fifteen-bit address bus 27 to the memories 23 and 24 and to a chip select circuit 28. Signals on lines AB0 and AB10–AB14 are decoded by the chip select circuit 28 to selectively enable the elements of the processor module 16. The microprocessor 20 is also connected through lines AB0–AB3 of the address bus 27 to the decoder circuit 25. Signals on these lines are decoded by the decoder circuit 25 to selectively enable the I/O modules 17 and 18 in the I/O interface section 29. Each of these I/O modules 17 and 18 is connected through a slot enable line (SEN 0–SEN 7) 30 to the decoder 25 to receive the enabling signals.

The I/O modules 17 are connected to the data bus 26 to receive 8-bit bytes of data, when enabled through a respective slot enable line 30. The standard I/O modules 17 are connected by lines 31 (only some of which are shown in FIG. 2) to single-bit digital devices 32 on a controlled machine 33. A standard I/O module 17 can be an input module that is connected to eight single-bit sensing devices, such as photocells or limit switches, or it can be an output module that is connected to eight single-bit output devices, such as solenoids or motor starters.

Figure 6:
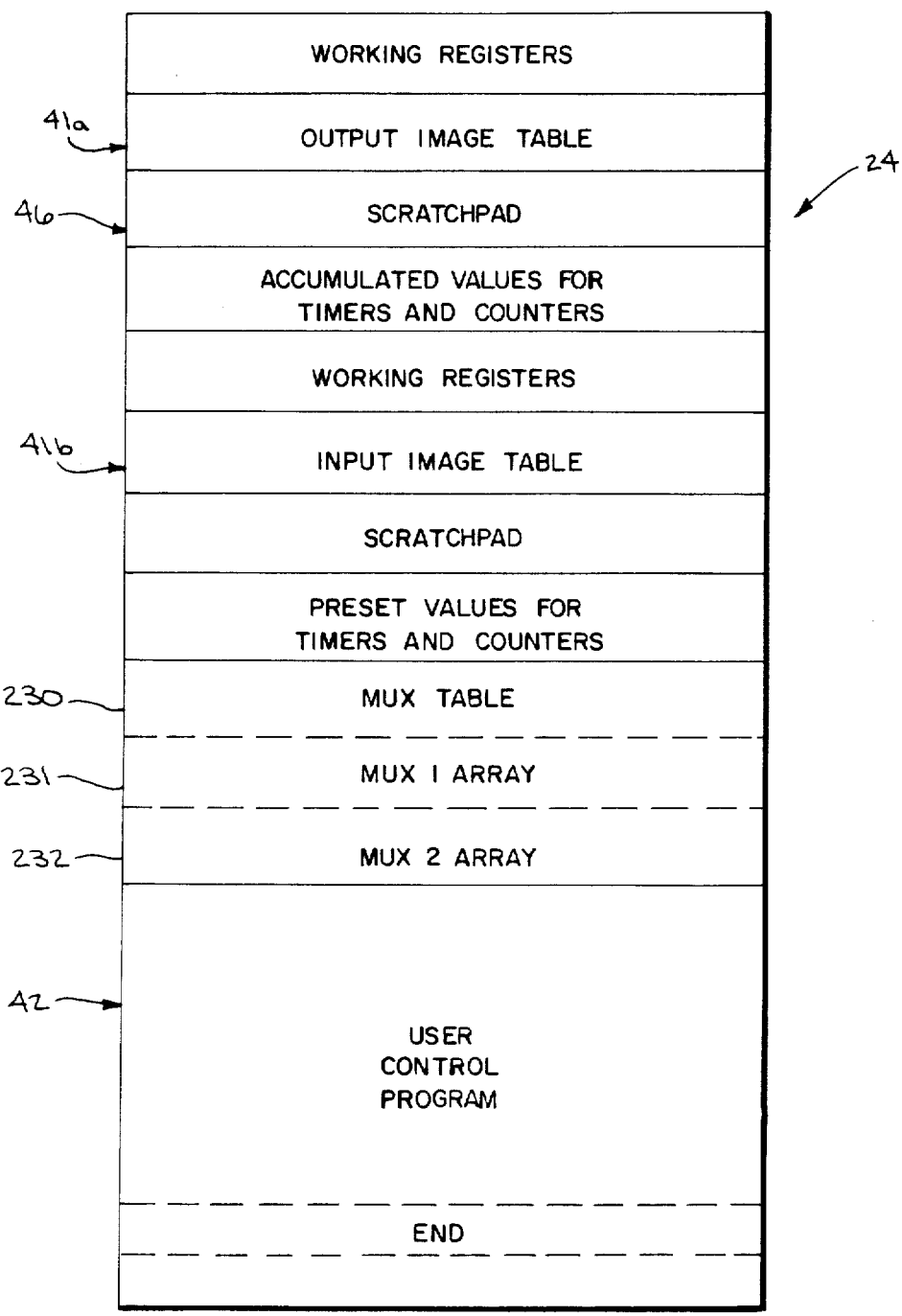
FIG. 6 is a memory map diagram of the contents of the RAM memory in FIG. 2.

As in several prior controllers, input status data and output status data are coupled between the RAM 24 and the I/O modules 17 during a program controlled I/O scan. Input status data represents the condition of sensing devices 32, while output status data will operate digital output devices 32. Referring particularly to FIGS. 2 and 6, during each I/O scan, input status data is coupled to an input image table 41b stored in the RAM 24. This data is subsequently examined by program instructions in the user control program 42, which is also stored in the RAM 24. During execution of the control program 42, output status data is generated and this data is stored in an output image table 41a for coupling to output modules during the next I/O scan.

Most of the control program instructions stored in the RAM 24 are instructions that are familiar to users of programmable controllers. These instructions have been developed with the art into a relatively standard set of program instructions. These instructions perform operations which are identified by mnemonics such as XIC, XIO, BST, BND, GET, PUT and TON 0.1, to name a few. These instructions are not directly recognized by microprocessors, because each microprocessor has its own instruction set devised by its respective manufacturer. Consequently, each control instruction in the user control program 42 must be converted to microprocessor machine language for its execution. For a more complete description of the control program instruction set, reference is made to U.S. Pat. No. 3,942,158 and for a more complete of the manner in which these control instructions are converted to microprocessor machine language for execution, reference is made to copending U.S. patent application Ser. No. 43,897, filed on May 30, 1979 and entitled "Mini-Programmable Controller." In the preferred embodiment, the microprocessor 20 is a Z80A microprocessor available from Zilog, Inc. and for a description of its instruction set as well as a description of its architecture and operation, reference is made to the "Z80-CPU Technical Manual," copyright 1976 by Zilog, Inc.

Figure 5:
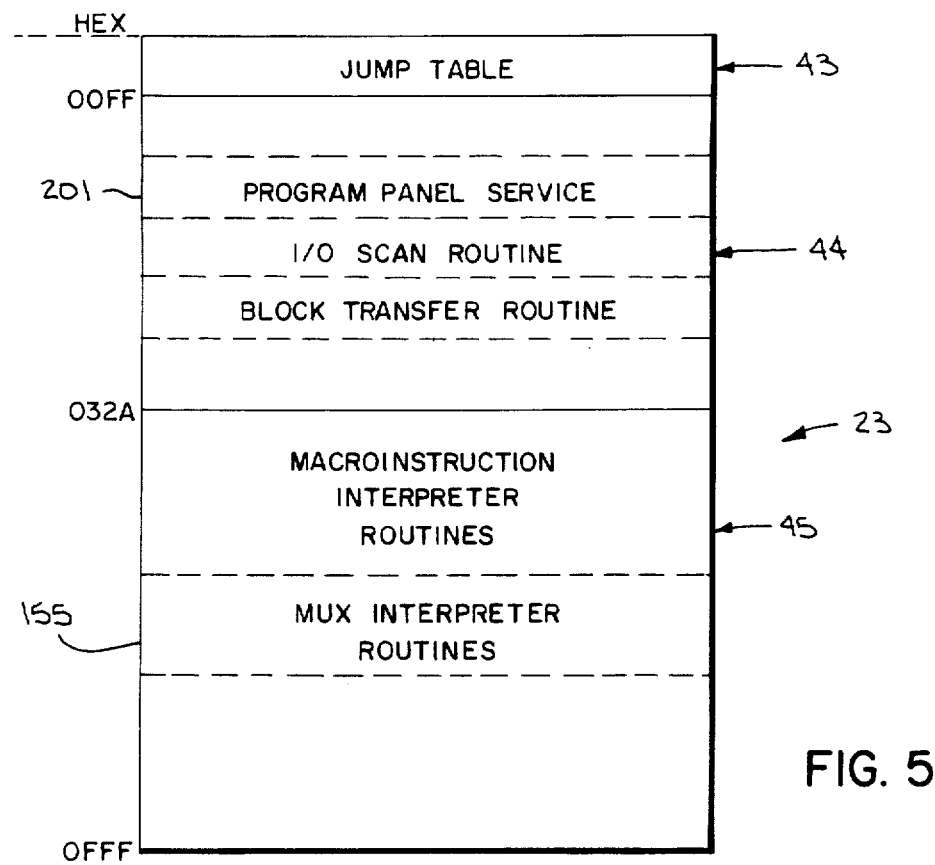
FIG. 5 is a memory map diagram of the contents of the ROM memory in FIG. 2.

The control program 42 of FIG. 6 is stored in a read-/write RAM memory 24 of FIG. 2, so that the I/O image table and program instructions can be easily updated and revised. Machine instructions for the microprocessor 20, on the other hand, are not ordinarily altered and nonvolatile storage of such instructions is desirable. The microprocessor's machine instructions are stored in the ROM 23, which has a capacity for storing 6K of 8-bit bytes of data. The organization of the ROM 23 is seen in FIG. 5. A jump table 43 is stored in the lowest address lines of the ROM 23, followed by a group of firmware routines 44. The firmware routines 44 include an I/O scan routine, a program panel service routine and a block transfer routine. Following the basic firmware routines 44 are a group of macroinstruction interpreter routines 45, which are stored in the higher address lines in the ROM 23. Each of these routines corresponds to a distinct operation code in the set of control instructions, or macroinstructions, used to develop the control program 42 stored in the RAM 24. Each macroinstruction in the control program 42 is linked to one of the interpreter routines 45 in the ROM 23, as will be explained in detail below.

To read a control program instruction, the main microprocessor 20 executes a FETCH routine comprised of microprocessor machine instructions. Most of the control program instructions include both a nine-bit operand address and a seven-bit operation code which are stored on even and odd lines, respectively, in the RAM 24. These are loaded into internal registers in the microprocessor 20 during the FETCH routine and the microprocessor 20 then jumps to the interpreter routine corresponding to the operation code. The operation code is, in fact, an address in the jump table 43 which is stored in the ROM 23. Or in other words, the jump table 43 contains statements for jumping to the address of the first instruction in the interpreter routine that corresponds to the operation code. The last portion of each interpreter routine includes the FETCH routine, which is executed to fetch the next control program macroinstruction.

TABLE 1

| Fetch Routine | |
|---|---|
| Instruction Mnemonic | Comment |
| POP HL | Get next instruction; store the operand address in the L register; and store the operation code in the H register. |
| LD E,L | Load operand address (the low byte of the control program instruction) into the E register. |
| LD L,H | Form the address in HL which |
| LD H,C | specifies a location in the jump table 43 in the ROM 23. |
| JP(HL) | Jump indirect to the interpreter routine via the jump table 43 in the ROM 23. |

The main microprocessor 20 makes use of a number of internal registers in executing the FETCH routine and the other routines described herein. These registers include:

PC—a 16-bit program counter
SP—a 16-bit stack pointer
B&C—two 8-bit registers arranged as a pair
D&E—two 8-bit registers arranged as a pair
H&L—two 8-bit registers arranged as a pair.

The program counter PC stores the memory address of the current microprocessor machine instruction to be read from the ROM 23 while the stack pointer SP is employed to store the memory address of the next control macroinstruction to be read from the RAM 24. The stack pointer SP is initialized to point at the first control instruction in the control program 42, and it is incremented each time the FETCH routine is executed to sequentially address each sixteen-bit control program instruction. When the entire control program 42 has thus been scanned and the I/O scan performed, the stack pointer SP is reset to the beginning of the control program 42 and the scan is repeated.

The "standard" set of programmable controller instructions includes bit-oriented instructions, logic instructions, and word-oriented instructions. Bit-oriented instructions are employed to manipulate single bits of data and each of these instructions has a four-bit operation code and a three-bit pointer code that are together coupled through the jump table 43 to a respective interpreter routine. A typical interpreter routine for XIC2 is given in Table 2. This interpreted routine examines bit 2 of an input status byte in the I/O image table 41a and 41b. Bit 2 in this instance may represent the status (i.e., opened or closed) of a switch on the controlled machine 33.

TABLE 2

| XIC2 Interpreter Routine | |
|---|---|
| Instruction Mnemonic | Comment |
| LD A, (DE) | Load indicated byte from I/O image table in the A register. |
| BIT 2,A | Test the specified bit in this byte. |
| Jr NZ,FETCH | Jump to fetch next macroinstruction if bit 2 equals 1 (which represents closed contacts). |
| RES O,B | Reset rung status in B register if bit 2 equals 0 (which represents open contacts). |
| FETCH: | |

In addition to bit-oriented controller instructions, there are logic instructions and word-oriented instructions. A BST instruction, for example, is a logic instruction which directs the controller to begin a new branch on a ladder diagram of the type well known in the art. Its interpreter routine performs this logical function by setting a bit in the microprocessor B register which is used to store rung and branch conditions.

Examples of word-oriented instructions include arithmetic instructions and timer and counter instructions. A timer instruction such as TON 0.1, compares an accumulated data word to a preset data word and determines whether a timer has "timed out." If it has, the output is turned on. Other word-oriented instructions are GET and PUT which exchange words of data between a scratch pad area 46 in the RAM 24 and the accumulator (A) register in the microprocessor 20.

The operation codes in the control program instructions in the RAM 24 have seven bits of coded data that cannot be mapped directly to the interpreter routines 45 during the FETCH program. Instead, the control program instructions in the RAM 24 use operation codes and bit pointer codes which are assigned by the program panel 12 when they are loaded. The use of such untranslated codes allows the program panel 12 to be used with other prior programmable controllers that recognize them. To convert these untranslated codes to operation codes and bit pointer codes which are recognized by the present programmable controller, a translator PROM 47 is used.

Referring particularly to FIG. 2, the translator PROM 47 is connected to the RAM 24 to receive at its address terminals all data read from the RAM 24. The data bus 26 is divided into a main branch 26a and a memory data input branch 26b and a memory data output branch 26c both of which stem from the main branch 26a, and the latter two of which are coupled by a two-way branch 26d to the RAM 24. A set of buffers 48 connects the memory data input branch 26b to the two-way branch 26d, and the translator PROM 47 connects the two-way branch 26d to the memory data output branch 26c. The translator PROM 47 is a 512-line by eight-bit mask programmable read-only memory with nine address inputs, A8–A0, and eight data outputs 49. The upper address input A8 is connected through a translating line 50 to the chip select circuit 28 and an enable input on the translator PROM 47 is connected by an enable line 51 to the chip select circuit 28. The lower eight address inputs A7–A0 of the translator PROM 47 are connected to the two-way branch 26d of the data bus 26, and the eight data outputs 49 on the translator PROM 47 are connected to the main branch 26a of the data bus 26.

The upper 256 lines of the translator PROM 47 each store an eight-bit pattern which is identical to that which is applied to the address terminals A7–A0 to read that line. As a result, when the address terminal A8 is high, data read from the RAM 24 is effectively coupled through the PROM 47 without being translated. When the address terminal A8 is low, untranslated operation codes stored in the RAM 24 are applied to the address terminals A7–A0 and corresponding translated operation codes are read out onto the data bus 26 from one of the lower 256 lines of the translator PROM 47. The address terminal A8 is controlled by the chip select circuit 28 which drives it low when control program instruction operation codes are read from the RAM 24 and which drives it high when other data is read from the RAM 24.

The program instructions with untranslated codes are loaded into the RAM 24 through the program panel 12. The program panel 12 is connected to the interface 22 through a pair of two conductor transmission lines 55 and the program panel interface 22 is enabled through a CS USART line 53 in which is driven by the chip select circuit 28. In addition, the interface 22 is connected through a two-megahertz clock line 54 to the timing circuit 21, and it is connected through the read and write control lines 38 and 39 to the microprocessor 20. When data is entered through the program panel 12, an interrupt signal is transmitted to the microprocessor 20 through an interrupt line 56, and a program panel service routine which is stored in the ROM 23 is executed to control communication between the program panel 12 and the RAM 24. Control program instructions and other data entered through the program panel 12 are written into the RAM 24 through the input buffers 48 which are enabled by the chip select circuit 28 through control line 52.

Figure 3:
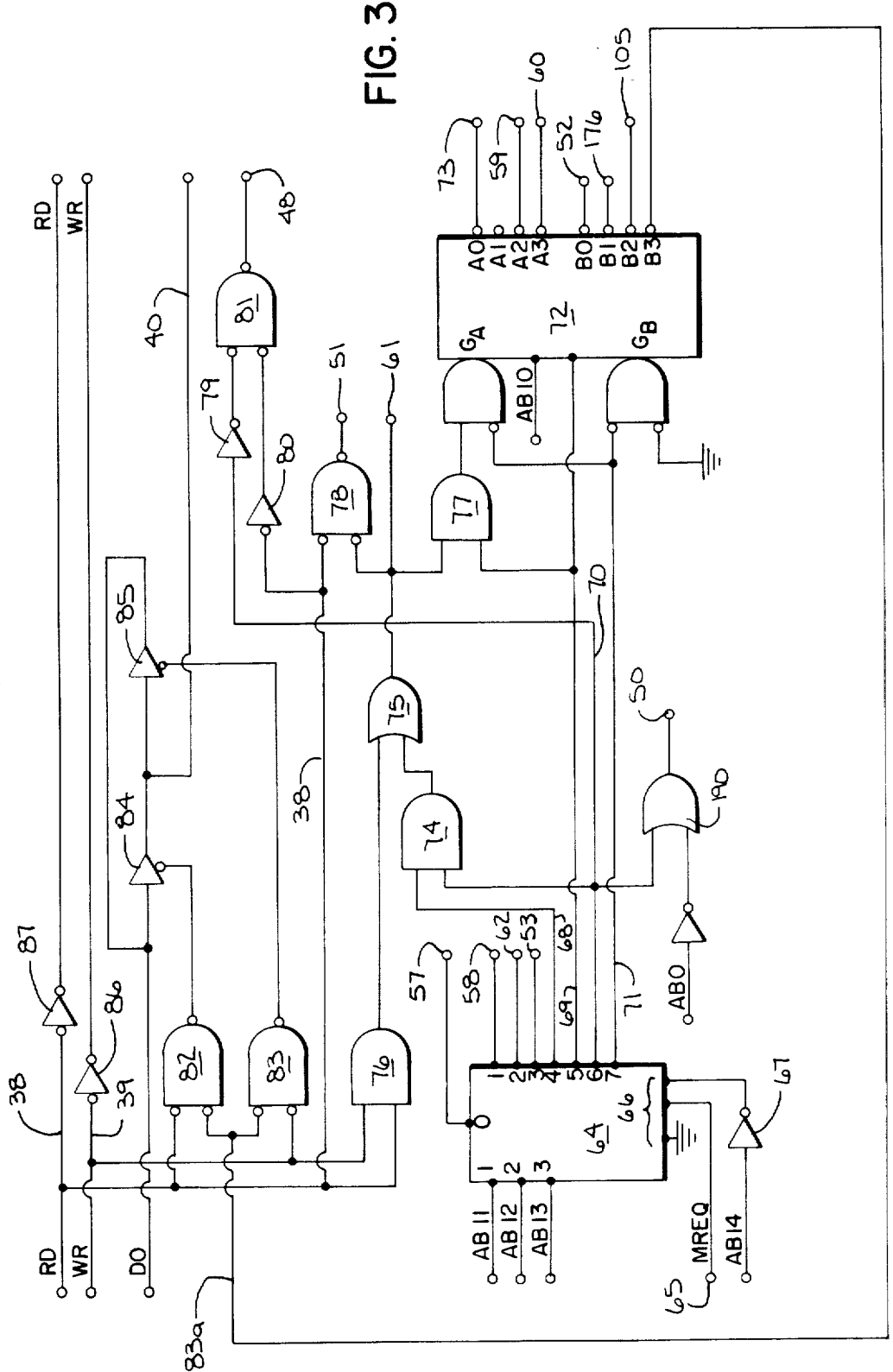
FIG. 3 is an electrical schematic diagram of the chip select circuit of FIG. 2.

In controlling the flow of data between the memories 23 and 24 and the I/O interface section 29, the microprocessor 20 is assisted by the timing circuit 21 and the chip select circuit 28. The chip select circuit 28 is driven by leads in the address bus 27 and it connects to the read and write control lines 38 and 39 and a memory request (MREQ) control line 65 which are driven by the microprocessor 20. As shown in FIG. 3, signals on lines AB11-AB13 of the address bus 27 are decoded by a three-line-to-eight-line decoder 64 in the chip select circuit 28. The memory request (MREQ) line 65 connects to one of the three enable inputs 66 on the decoder 64, a second enable input 66 is grounded, and the AB14 line is connected through an inverter 67 to the third enable input 66. Control lines 57 and 58 which enable the ROM 23 are connected to the "0" and "1" outputs of the decoder 64 and a control line 62 connects the "2" output on the decoder 6464 to the decoder 25 and the buffers 63. The CS USART line 53 is connected to the "3" output and the remaining outputs "4"–"7" are further decoded to drive other elements of the programmable controller.

Outputs "4"–"7" on the decoder 64 are coupled through respective lines 68–71 to a dual two-to-four-line decoder 72 having gate enable inputs GA and GB. Two other inputs "1" and "2" are coupled to one of two sets of outputs on the decoder 72, either A0–A3 or B0–B3, depending on which gate input GA or GB is enabled. The line 69 connects the three-to-eight-line decoder 64 to the "2" input on the two-to-four-line decoder 72, and when gate GA is enabled, it generates an enabling signal on one of the RAM enable lines 59 and 60. A signal on the AB10 address line connected to the "1" input on the two-to-four-line decoder 72 selects which of these RAM enable lines 59 and 60 receives the enabling signal when a watchdog error or parity error is forced through a line 73 connected to the A0 output on the decoder 72. The other gate BG receives an enabling signal on the line 71 when the processor status word address 14K is generated on the address bus 27.

The line 68 and the line 70 emanating from the decoder 64 are also coupled through several gates to control signals on the buffer enable line 48 and the translator PROM enable line 51. The line 68 and the line 70 are coupled through an AND gate 74 to an input on an OR gate 75 and the read and write control lines 38 and 39 are coupled through an AND gate 76 to another input on this OR gate 75. The output of the OR gate 75 drives a RAM enable line 61 and it and the control line 69 are coupled through another AND gate 77 to one of the dual inputs GA. The output of the OR gate 75 and the read control line 38 are coupled through a low true AND gate 78 to the translator PROM enable line 51 and the control line 70 and the read control line 38 are coupled through inverters 79 and 80 to two inputs on another low true AND gate 81. The output of this AND gate 81 is connected to the buffer enable line 48.

The control line 70 and the AB0 address line are coupled through an OR gate 190 to control the translating control line 50. The address bus lead AB12 serves to enable the translator PROM 47 such that data read from odd numbered lines in the address range from 3000 to 3 FFF (hexadecimal) are translated and all other data is untranslated.

The read and write lines 38 and 39 are, in addition, each coupled to an input on one of two low true AND gates 82 and 83, each of which has another input connected to the B3 output of the two-to-four-line decoder 72 through a line 83a. The outputs of these two AND gates 82 and 83 are connected to enable inputs on two other gates 84 and 85 which couple the D0 line to the module ID line 40. The read and write lines 38 and 39 are also connected through respective drivers 86 and 87 to outputs on the chip select circuit 28.

Other control circuitry is included in the timing circuit 21. The timing circuit 21 provides timing signals, senses parity and other communication errors, and controls the mode of operation of the controller. Actual parity error checking is performed by a parity checker 88, seen in FIG. 2. It is connected to branch 26d of the data bus 26 and it is also connected through a parity line 89 to the timing circuit 21. The parity checker receives a stored parity bit through a parity out line 90 when data is read from the RAM 24. The stored parity is compared with the parity calculated for data read out on the data bus 26. When data is read into the RAM 24, the parity checker 88 calculates its parity and transmits it to the proper storage location in the RAM 24 through a parity in line 91. Parity errors are reported to the timing circuit 21 through the parity line 89.

Figure 4:
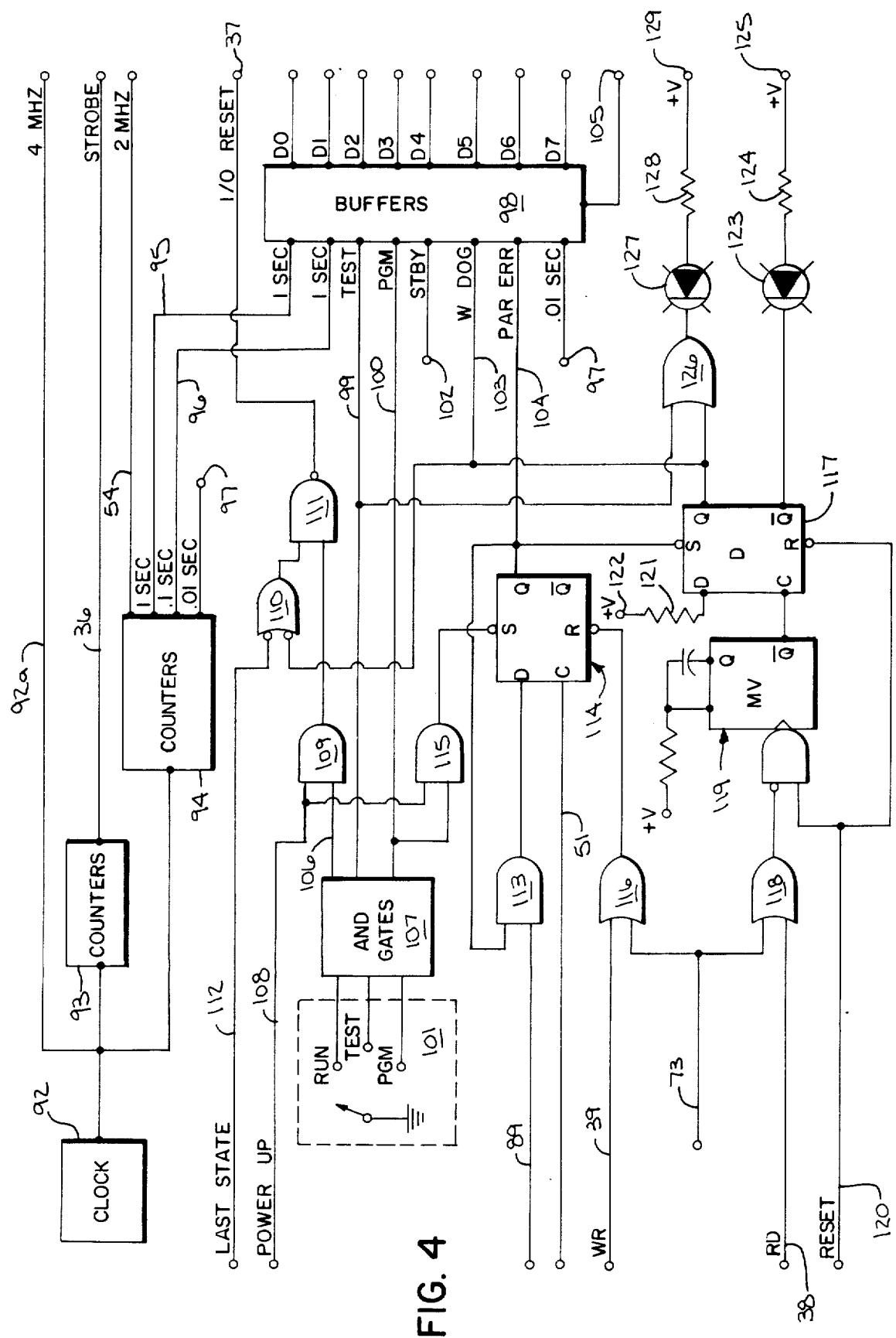
FIG. 4 is an electrical schematic diagram of the timing circuit of FIG. 2.

As seen in FIG. 4, the timing circuit 21 includes a clock 92 and two sets of counters 93 and 94. The clock 92 outputs a four-megahertz signal to the microprocessor 20 and to both sets of counters 93 and 94 on a four-megahertz line 92a. The output of the first set of counters 93 is connected to the strobe line 36. The second set of counters 94 has four outputs connected to the two-megahertz line 54, a 1-second time base line 95, a 0.1-second time base line 96 and a 0.01-second time base line 97. The 1-second time base line 95 is connected through a set of output buffers 98 to line D0 in the main data bus 26. Similarly, the 0.1-second time base line 96 and the 0.01-second time base line 97 are connected through the output buffers 98 to data bus lines D1 and D7, respectively. Other lines coupled through the buffers 98 include a TEST line 99 and a PROGRAM line 100 that couple a three-position mode switch 101 to lines DB2 and DB3 of the main data bus 26. A standby battery sensing line 102 is coupled to line D4 of the main data bus 26, and finally, watchdog status line 103 and parity error status line 104 are coupled to lines DB5 and DB6 of the main data bus 26. The buffers 98 are enabled through a status word line 105 originating at the B2 output of the decoder 72 in FIG. 3. When the address "14K" appears on the main address bus 27, the address is decoded by the chip select circuit 28, as explained previously, and eight bits of status data can be read by the microprocessor 20.

The mode switch 101 may be set for RUN, TEST or PROGRAM modes of operation. Lines 106, 99 and 100 corresponding to these three positions are coupled through a set of low true AND gates 107 to the buffers 98 and several other gates. The RUN mode line 106, which is active in the logic high state, is coupled with a power-up sensing line 108 to an AND gate 109. The output of this AND gate 109 is coupled with the output of a low true NAND gate 110 through a high true NAND gate 111 to the I/O reset line 37. The watchdog status line 103 and a line 112 are connected to the inputs of the low true NAND gate 110.

The gates 109–111 condition the state of the I/O reset line 37 as follows. When the processor module 16 is operating in the TEST mode or the PROGRAM mode and power is lost, the "last state" option cannot be selected. The line 112, which is usually connected to a switch to determine its logic state, permits a user to choose between deenergizing the I/O devices (I/O reset) or leaving them in their "last state," before operation is interrupted. The state of the line 112 is also ignored when an error is reported on the watchdog status line 103.

The other circuitry in FIG. 4 monitors watchdog timer errors and parity errors which are reported on the watchdog and parity error status lines 103 and 104. The parity line B9 is coupled through an AND gate 113 to a D input on a D-type flip-flop 114 and the translator PROM enable line 51 is connected to a clock input C on this flip-flop 114. The power-up sensing line 108 and the PROGRAM line 100 are coupled through another AND gate 115 to a set terminal on the flip-flop 114, while the write line 39 and the force error line 73 are coupled through an OR gate 116 to a reset terminal on the flip-flop 114. The Q output of the flip-flop 114 is coupled back through an input of the AND gate 113, is connected to the parity error status line 104 and is connected to a set terminal on a D-type, watchdog status flip-flop 117.

The remaining circuitry pertains to the watchdog timer and includes an OR gate 118 that couples the force error line 73 and the read line 38 to one of the dual clock inputs on a watchdog timer 119. The timer 119 includes a monostable multivibrator and an RC coupling circuit for determining the timing constant. A reset line 120 coming from the microprocessor 20 is connected to the other clock input of the timer 119 and to a reset terminal on the watchdog status flip-flop 117. The D input of the flip-flop 117 is pulled high through a resistor 121 by a source of positive d-c voltage 122 and its clock input C is connected to the Q output of the multivibrator 119. When the multivibrator 119 is clocked by a logic low clock signal, it is set. If allowed to time out without receiving another clock pulse, it becomes reset and the watchdog flip-flop 117 is set. This turns on the watchdog error LBD 123, which is connected to the Q output of the watchdog flip-flop 117, and which is supplied by current through a pull-up resistor 124 from a source of positive d-c voltage 125. The Q output of the flip-flop 117 and the TEST line 99 are coupled through an OR gate 126 to a RUN LED 127. This LED 127 is supplied by a positive d-c voltage source 129 through another pull-up resistor 128 and is conducted when the watchdog flip-flop is reset to indicate a satisfactory or "go" condition, and is turned off when the watchdog flip-flop is set.

When the programmable controller is in the run mode it sequentially reads out the control program instructions and executes them. Each control instruction is executed by being mapped to its corresponding macroinstruction interpreter routine, which in turn is comprised of a set of microprocessor machine instructions that direct the elements of the programmable controller to carry out the desired functions. The last control instruction in the user control program 42 is an "END" instruction which maps into the I/O scan routine stored in the ROM 23. In addition to inputting data from sensing devices on the controlled machine 33 and outputting data to the operating devices on the controlled machine 33, the I/O scan routine resets the stack pointer SP to the beginning of the user control program 42. Therefore, the user control program 42 is reexecuted continuously until the controller is switched to another mode. A complete scan through the user control program 42 may require a few milliseconds for a short user program or tens of milliseconds for long user programs.

OPERATION

Figure 9:
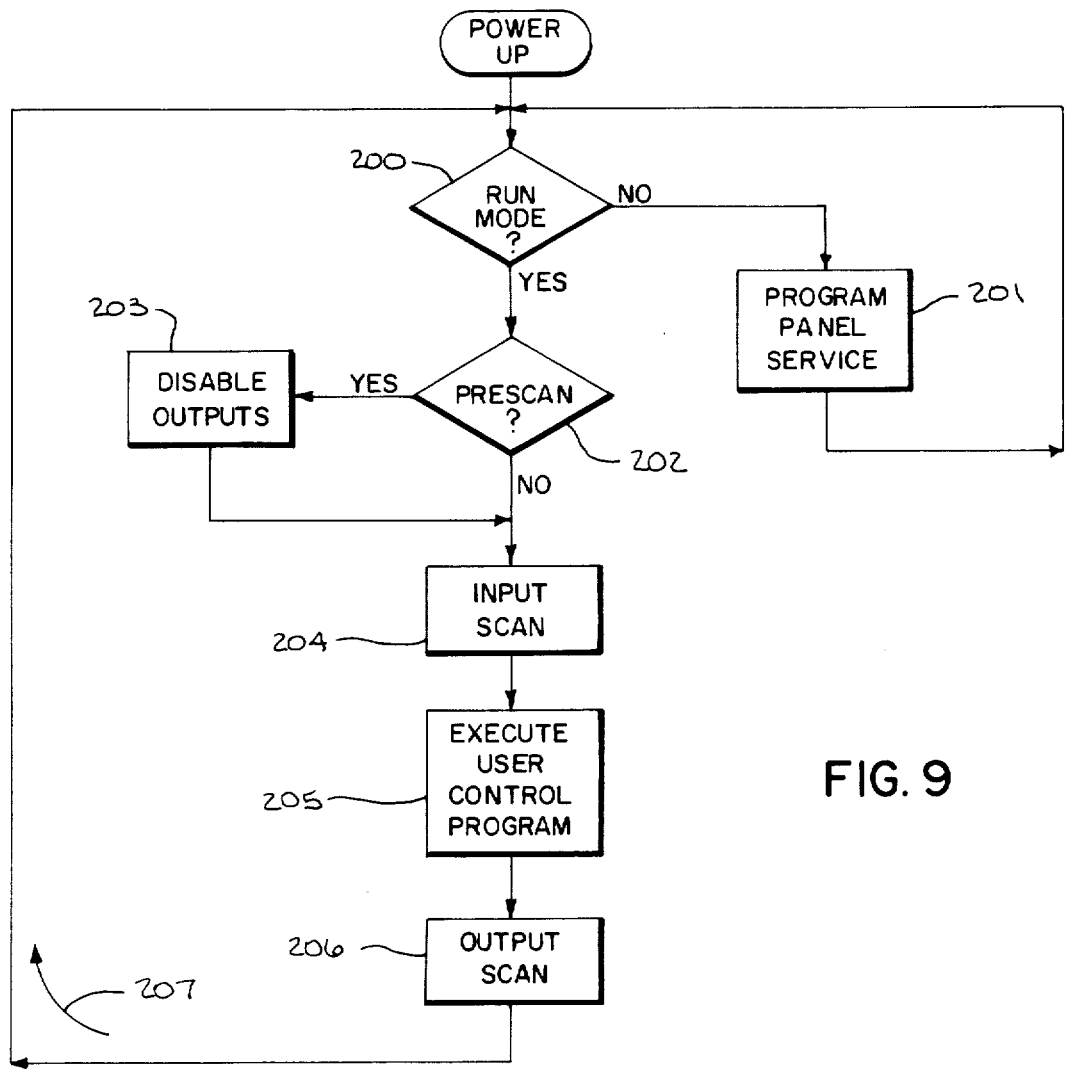
FIG. 9 is a flow chart of the basic sequence of operation of the programmable controller of FIG. 2.

Referring particularly to FIG. 9, when the programmable controller is first powered up it tests which mode of operation it is in by executing instructions indicated by decision block 200. If it is not in the "RUN" mode, the system branches to execute the program panel service routine 201. While in this program load mode, the user may enter control program instructions through the program panel 12 (FIG. 1) and edit them. When the user is satisfied with the control program, he switches the system to the "RUN" mode.

When the controller is switched to the RUN mode an initial "prescan" is made to initialize various data structures. This is detected at decision block 202 which branches to instructions indicated by process block 203 which disable all outputs during the prescan. The system then enters a sequence of programs in which the I/O data from all I/O modules is first input to the input image table 416 as indicated at process block 204. The user control program is then executed at process block 205, and then output scan is executed as indicated at process block 206. The controller loops at 207 and continues this sequence until the controller is switched from the RUN mode. After the first scan, or prescan, the outputs are enabled and the operating devices connected to the I/O modules are energized or deenergized in accordance with the control program instructions.

Figure 10:
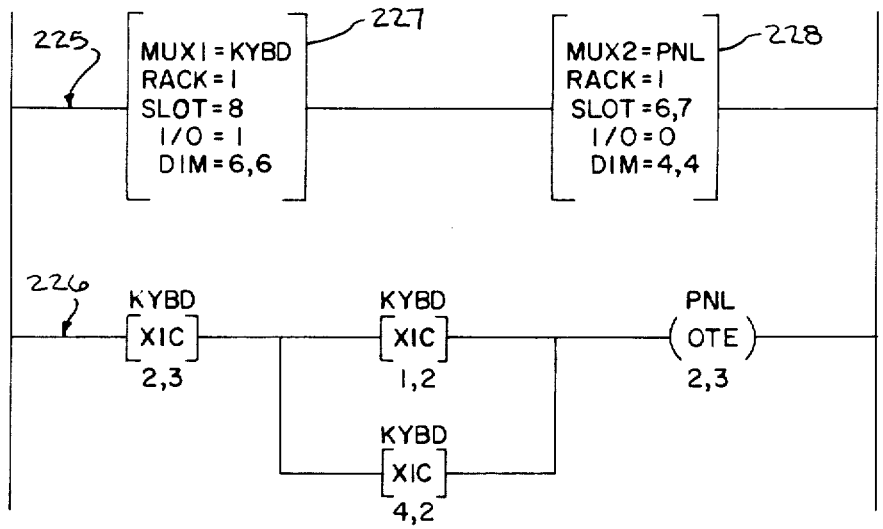
FIG. 10 is an example in ladder diagram format of a portion of the control program executed by the programmable controller of FIG. 2.

Referring particularly to FIGS. 1 and 10, an operator's station 210 may provide a large number of input and output devices which are to be operated by the programmable controller in conjunction with the controlled machine 33. The input devices may take the form of a matrix of pushbutton switches or keys 211, and the output devices may take the form of a matrix of indicator lights 212. The switch matrix is connected to a multiplexer input module 19 through a cable 213, and the indicator matrix 212 is connected to two standard output modules 18 through a cable 214.

The multiplexer input module 19 is disclosed in U.S. Pat. No. 4,360,913. It outputs a one-of-six select code to the switch matrix to enable one row therein, and six bits of switch data is then input to the module 19 to indicate the state of the six switches in the enabled row. The one-of-six select code is written to the module 19 as output data during the programmable controller's output scan, and the resulting data from the switch matrix 211 is input from the module 19 during the input scan.

The output modules 18 are conventional d.c. output modules. The module 18 in slot 6 outputs a one-of-four row selector code to the indicator matrix 212 and the module 18 in slot 7 outputs a 4-bit "nibble" of data to the selected row of indicators. The four nibbles of output data are latched by quad latches (not shown in the drawings) contained inside the operator station 210. The selector code for the indicator matrix 212 is sequenced by data which is output to the slot 6 module 18 during the programmable controller's output scan, and the indicator matrix status data is output to the slot 7 module 18 during the same output scan.

There are many variations to the particular I/O multiplexing arrangement disclosed herein. For example, the dimensions of the input or output matrices may differ from the 6 by 6 switch matrix 211 or the 4 by 4 indicator matrix 212. The preferred embodiment described herein will accept I/O matrices which range in size from 1 by 1 up to 8 by 8. Also, it should be apparent that a choice in the type of multiplexing I/O modules is possible. If two I/O slots are employed, relatively conventional and inexpensive I/O modules may be employed to multiplex a large amount of I/O data. On the other hand, by using more complex "high density", or "intelligent", I/O modules, the same multiplexing function can be performed from a single I/O slot.

FIG. 10 illustrates in ladder diagram form a portion of the user control program which relates to the operator station 210. The first rung 225 is a multiplexer definition rung which is not executed by the programmable controller, but instead is employed by the program panel 12. The second rung 226 is an example rung which illustrates the energization of an indicator in the matrix 212 in response to the operation of three switches in the matrix 211. There are, of course, many additional rungs in a typical control program which examine the state of other switches and other input devices and which operate other output devices and indicators.

The multiplexer definition rung is input by the user through the programming panel 12 to define two I/O multiplexers associated with the operator station 210. As will be explained in more detail below, the entry of the multiplexer definition data creates data structures in the programmable controller's RAM memory 24 which are employed by the input scan process 204 and output scan process 206 (FIG. 9), and which may be accessed by control instructions in the user's program. The first definition indicated by block 227 defines a multiplexer labeled "KYBD" which is associated with slot number "8" in I/O rack number "1". It is an input multiplexer "I", and it has six rows and six columns "6, 6". The second multiplexer definition 228 is labeled "PNL" and it is associated with slot numbers "6" and "7" in I/O rack number "1". It is an output multiplexer "O" and it has four rows and four columns "4, 4".

Figure 7:
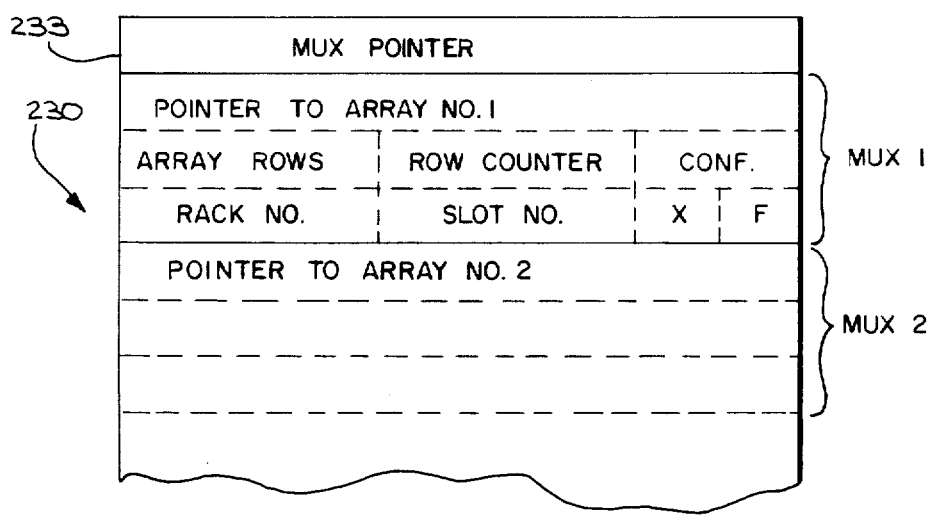
FIG. 7 is a diagram of the contents of the MUX table which forms part of the memory map of FIG. 6.

Referring particularly to FIGS. 6 and 7, the multiplexer definition data is employed to create a MUX table 230 and two arrays 231 and 232 in the RAM 24. The MUX Table 230 includes a MUX pointer byte 233 which is an index, or offset, to the multiplexer data in the table 230. This data includes three 8-bit bytes of information for each defined multiplexer.

The first byte is a pointer to the memory address of the array associated with the multiplexer and the second byte includes three bits which indicate the number of rows/memory lines in the array. The third byte includes six bits which identify the rack number and slot number of the multiplexer and a 2-bit configuration code in the second word indicates the nature of the multiplexer. Table 3 lists the configuration codes.

TABLE 3

00 = Output multiplexer at a single I/O slot.
01 = Output multiplexer with data output at I/O slot No. and selector code at slot No. −1.
11 = Input multiplexer at a single I/O slot.
10 = Input multiplexer with data input at I/O slot No. and selector code output at I/O slot No. −1.

Figure 8:
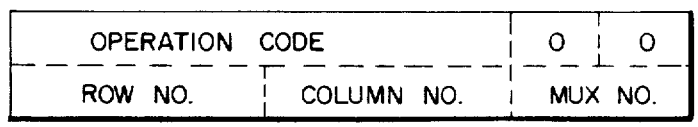
FIG. 8 is a diagram of a control instruction which incorporates the present invention.

Referring particularly to FIGS. 6 and 10, a bit in either of the multiplexer arrays 231 or 232 can be manipulated with conventional programmable controller instructions. The rung 226 is a representative set of such instructions in which three switches in the "KYBD" matrix 211 are examined and an indicator in the "PNL" matrix 212 is operated. The format of such controller instructions is shown in FIG. 8, in which the first of two instruction words is an operation code with its two most significant bits equal to zero. These operation codes are mapped to a MUX interpreter routine 155 (FIG. 5) when executed, and these interpreter routines examine the second, word, or operand, of the instruction.

The operand of each MUX control instruction includes a 2-bit code which identifies which of four possible multiplexers is being addressed. This code is employed by the MUX interpreter routine 155 to read the proper array pointer (FIG. 7) from the MUX table 230. A three-bit array row pointer is also contained in the operand and this is added to the array pointer to produce the RAM memory address of the selected row in the MUX array 231 or 232. A three-bit column pointer code is then employed by the MUX interpreter routine 155 to point to the desired bit in the addressed MUX array word. This bit may be examined or set to a desired logic state just as any conventional I/O device bit stored in the output image table 41a or input image table 41b.

Referring particularly to FIG. 9, the status of all multiplexer input and output arrays 231 and 232 are updated as part of the input scan 204 and the output scan 206. This coupling of I/O status data between the multiplexer arrays 231 and 232 and their corresponding input or output modules is performed automatically and is "transparent" to the user. Both routines employ the two-bit configuration code of Table 3 to determine the direction and nature of the I/O data transfer to be performed.

Figure 11:
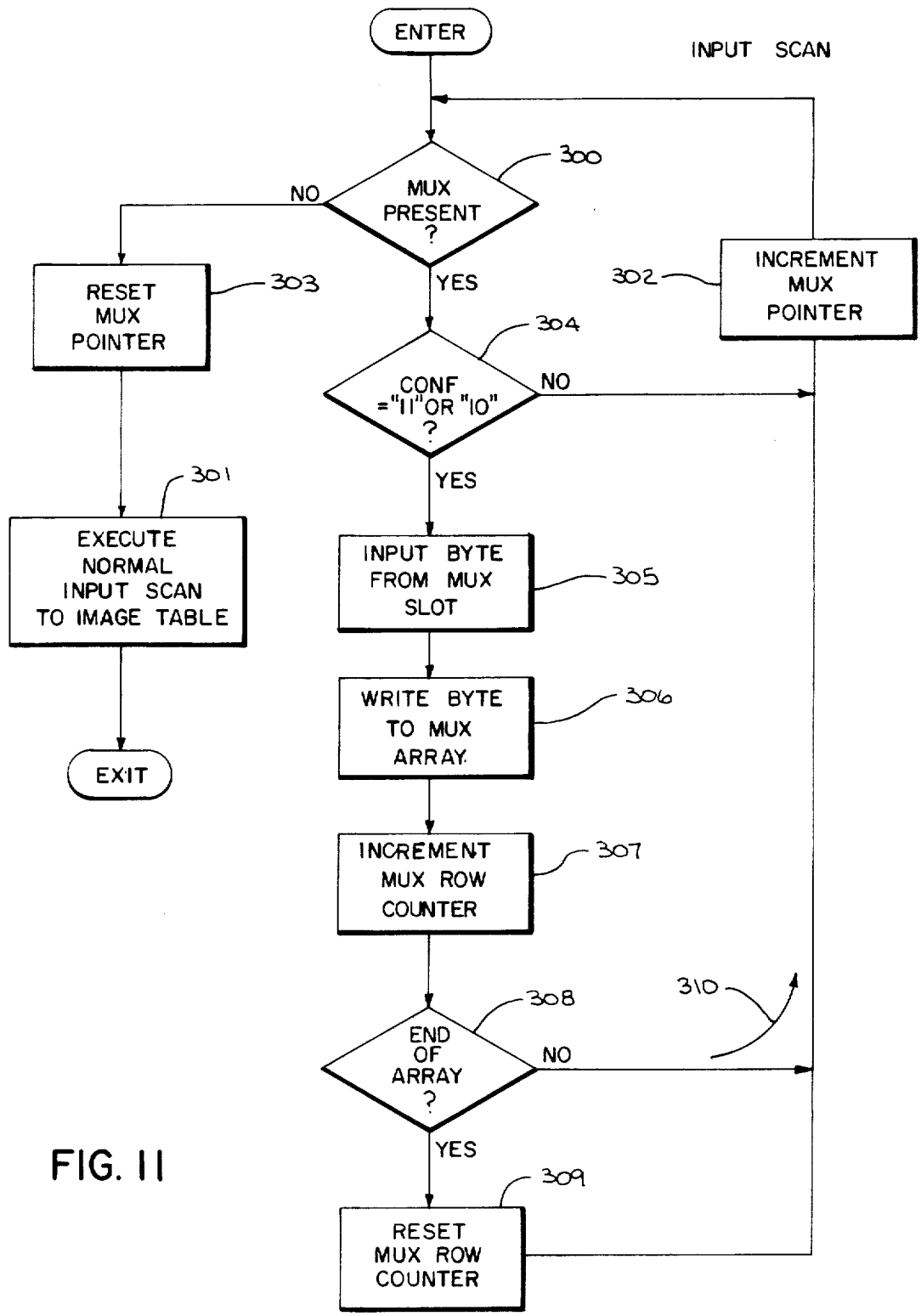
FIG. 11 is a flow chart of the input scan function which forms part of the sequence of operation in FIG. 9.

Referring particularly to FIG. 11, when the input scan routine 204 is executed, instructions indicated by decision block 300 are executed to determine if a multiplexer has been defined. If not, the normal input of I/O status data from the I/O racks is performed as indicated at process block 301. On the other hand, if the MUX pointer 233 (FIG. 7) is set to a value other than "FF"(HEX), a multiplexer is present and requires updating. The MUX pointer 233 points to the first multiplexer (MUX 1) in the table 230, and this pointer 233 is incremented at process block 302 to sequentially update each input multiplexer which has been defined. When the last multiplexer array has been serviced by the input scan routine 204, the MUX pointer 233 is reset at 303 to the first multiplexer in the table 230.

Referring to FIGS. 6, 7 and 11, when a multiplexer is present, its configuration code is examined at decision block 304 to determine if it is an input multiplexer. If so, a byte of data is input from the I/O module indicated by the rack and slot codes in the MUX table 230 as indicated by process block 305. This byte of data is then written to the multiplexer's array in the RAM 24 at the location indicated by the array pointer and the three-bit row counter in the MUX table 230 as indicated at 306. The row counter is then incremented at 307 for the next input scan and a check is made at decision block 308 to determine if the end of the array has been reached. If so, the row counter is reset at process block 309 to point at the first row of the array. A loop indicated at 310 is established to input one byte of data from each input multiplexer which has been defined.

Figure 12:
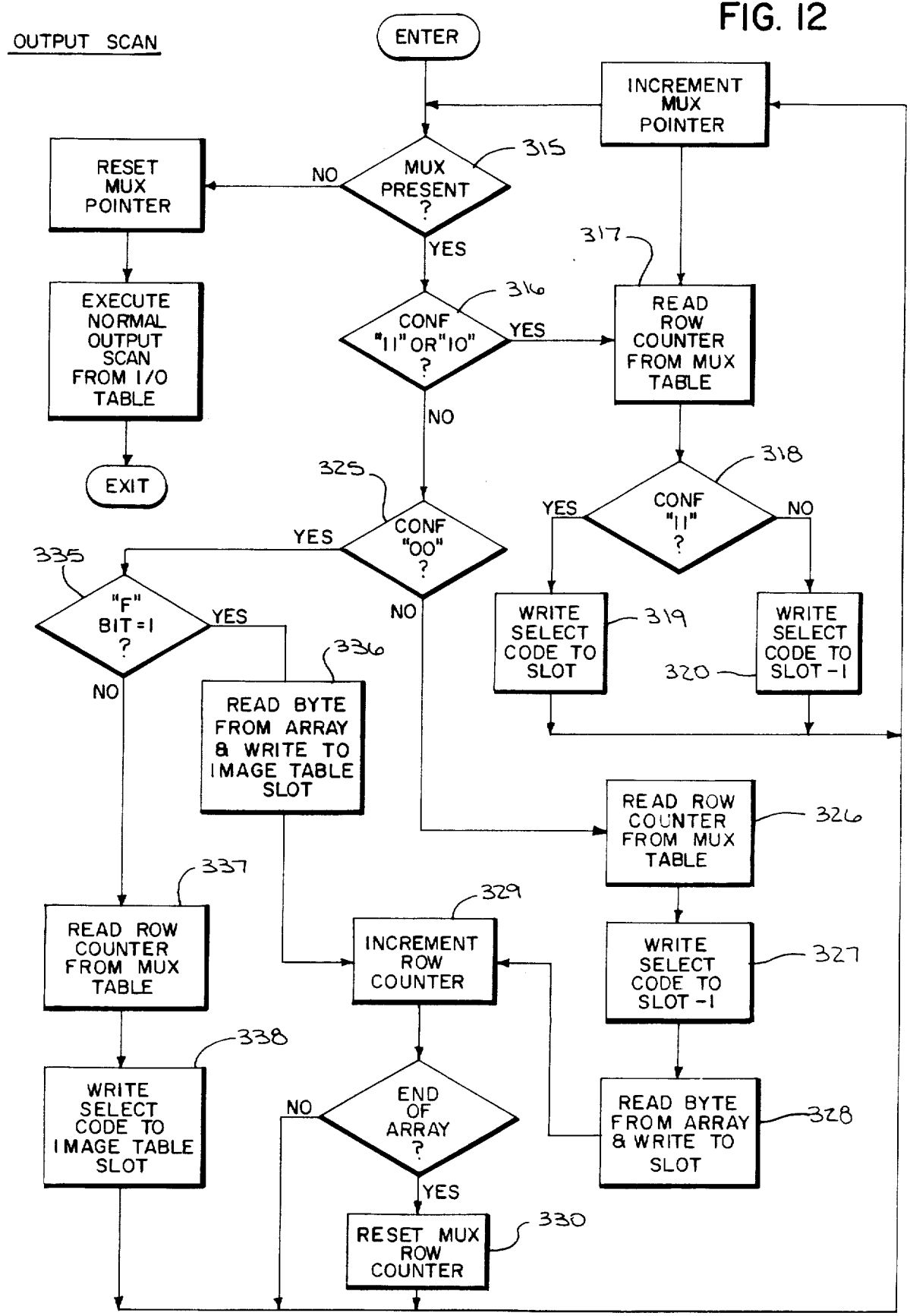
FIG. 12 is a flow chart of the output scan function which forms part of the sequence of operation in FIG. 9.

Referring particularly to FIGS. 6, 7 and 12, the output scan routine 206 is similar in some respects to the input scan routine 204 except that it not only outputs status data to the multiplexers, but it also outputs select codes to each multiplexer module. If a multiplexer has been defined, as determined at decision block 315, the configuration code in the MUX table 230 is examined at decision block 316 to determine if it is an input multiplexer. If so, the row counter is read from the MUX table 230 and a select code is created therefrom, as indicated at process block 317. The select code is an 8-bit byte of data in which one bit is enabled to indicate which of eight rows in the array serviced by the multiplexer module is active. If this select code is to be output to the same multiplexer input module from which the status data is input (CONF=11), as determined at 318, it is written to the same I/O rack and slot number at process block 319. Otherwise, as indicated at process block 320, the select code is output to the I/O module located in the adjacent slot.

If an output multiplexer is indicated at decision block 316, a check of the configuration code is made at decision block 325 to determine if one or two I/O modules are employed as the output multiplexer module. If a two module multiplexer is employed, the row counter is read from the MUX table 230 at process block 326, and the corresponding select code is written to the output module located adjacent to the slot indicated in the MUX table 230, as indicated at 327. As indicated at process block 328, the byte of status data for the indicated row is then read from the MUX array and is written to the output module indicated by the rack and slot numbers. The row counter in the MUX table 230 is then incremented at block 329, and if necessary, the row counter is reset at 330 to the beginning of the MUX array.

If a single module output multiplexer is present, as determined at decision block 325, select codes and a row of status data are to be alternately output to the same slot during successive output scans. An "F" bit in the MUX table 230 indicates whether the select code or status data is to be output, and this bit is examined at decision block 335. If the bit is set, a byte of data is read from the indicated row of the MUX array at process block 336 and is written to the indicated slot. The row counter is then incremented at block 329 and during the subsequent output scan, the row counter is read from the MUX table 230 at process block 337 to produce a new select code. This select code is output to the multiplexer module at process block 338.

It should be apparent that numerous variations are possible from the preferred embodiment of the invention. For example, the updating of I/O status data between the entire MUX array and its corresponding I/O module may be performed during a single I/O scan rather than distributing the process over a series of I/O scans. Also, such an updating may be performed under the control of the user program rather than the input scan routine 204 or output scan routine 206. Referring to FIG. 7, a single bit "X" is available in the MUX table 230 as an indicator which the user program may set. The I/O scan routines 204 and 206 may examine the state of the "X" bit to determine if the user has elected to control the I/O updating to the multiplexer or whether the updating is to be performed by the routines 204 and 206. The user may elect to control the I/O update with selected rows of a multiplexer or the entire multiplexer may be updated with "block transfer" instructions such as those described in U.S. Pat. No. 4,293,924.

We claim:

1. A programmable controller which comprises: a memory for storing I/O data and a user control program; definition means responsive to a control instruction in the user control program for establishing an array of n rows by m columns in the memory for storing a block of I/O data associated with a designated I/O port;

I/O scan means for coupling I/O data between the established array and its designated port; and control instruction execution means responsive to an operation code in control instructions in the user control program for performing a logical operation on a single bit in the established array.

2. The programmable controller as recited in claim 1 in which the control instruction execution means is responsive to an operand code associated with the operation code which contains a row pointer code that selects a corresponding row in the array and a column pointer code which selects a bit in the selected row.

3. The programmable controller as recited in claim 1 in which there are a plurality of defined arrays stored in the memory and the control instruction execution means is responsive to an operand code associated with the operation code to select one of the defined arrays.

4. The programmable controller as recited in claim 1 in which the memory stores a table containing a pointer which indicates the memory address of the defined array and an I/O code which indicates the I/O address of the I/O port associated with the defined array.

5. The programmable controller as recited in claim 4 in which the I/O scan means is responsive to a selected control instruction in the user control program to transfer data between the defined array and the I/O port indicated by the I/O code.

6. The programmable controller as recited in claim 5 in which the table stores a row counter which indicates a selected row in the defined array, and the I/O scan means is operable to transfer data between the selected row and the I/O port each time the selected control instruction is executed.

7. The programmable controller as recited in claim 5 in which the table stores a configuration code which indicates if the data transfer is to be from the defined array to the indicated I/O port or is from the indicated I/O port to the defined array.

8. The programmable controller as recited in claim 1 in which the I/O scan means includes selector means for generating a select code to the I/O port and transfer means for transferring data between the I/O port and a row in the defined array which corresponds to the select code, and the I/O scan means is operable to sequentially generate select codes for the n rows of the defined array and perform n data transfers with the I/O port.

9. The programmable controller as recited in claim 8 in which the I/O port is comprised of two separately addressable I/O slots and the I/O scan means outputs the select codes to one I/O slot and the data transfer is made with the other I/O slot.

10. The programmable controller as recited in claim 9 in which a plurality of operating devices are connected together in a matrix of rows and columns, the select code I/O port is connected to the matrix and the select code received thereat is applied to the matrix to enable a row of operating devices, and the status of the operating devices in the enabled matrix row is set by the data transferred to the other I/O port.

* * * * *